United States Patent
Fukuyama et al.

[11] Patent Number: 6,160,937
[45] Date of Patent: Dec. 12, 2000

[54] OPTICAL FIBER ARRAY

[75] Inventors: Masashi Fukuyama, Komaki; Hironori Kurimoto, Kounan, both of Japan

[73] Assignee: NGK Insulators, Ltd., Nagoya, Japan

[21] Appl. No.: 09/271,463

[22] Filed: Mar. 18, 1999

Related U.S. Application Data

[63] Continuation-in-part of application No. 09/268,966, Mar. 16, 1999.

[30] Foreign Application Priority Data

Mar. 20, 1998 [JP] Japan .................................. 10-072073
Mar. 8, 1999 [JP] Japan .................................. 11-060819

[51] Int. Cl.$^7$ .................................................. G02B 6/26
[52] U.S. Cl. ............................................. 385/52; 385/137
[58] Field of Search ............................. 385/65, 120, 137, 385/83, 59, 49–52, 115–116

[56] References Cited

U.S. PATENT DOCUMENTS

| 5,379,360 | 1/1995 | Ota et al. | 385/59 |
| 5,446,815 | 8/1995 | Ota et al. | 385/33 |
| 5,482,585 | 1/1996 | Ota et al. | 156/158 |

FOREIGN PATENT DOCUMENTS 58-130309   8/1983   Japan .................................. 385/83

*Primary Examiner*—John D. Lee
*Assistant Examiner*—Michelle R. Connelly-Cushwa
*Attorney, Agent, or Firm*—Hurr & Brown

[57] ABSTRACT

An optical fiber array includes an upper substrate and a lower substrate in which V-shaped grooves are formed. Optical fibers are inserted and arranged in the V-shaped grooves and are solidified using an adhesive. The upper substrate comprises a fiber presser substrate for pressing the optical fibers in the V-shaped grooves and a covered fiber housing substrate in which covered optical fibers are housed. The lower substrate comprises a V-shaped groove section having V-shaped grooves in which the optical fibers are aligned and arranged, a covered optical fiber support section for supporting the covered optical fibers, and a V-shaped groove step section located between the V-shaped groove section and the covered optical fiber support section. The top surface and/or sides of a non-covered optical-fiber section are opened between the V-shaped groove section or the V-shaped groove step section and the coverage-removed end of the covered optical fibers. The optical fiber array minimizes stress remaining therein after an adhesive is hardened to fix the optical fibers, thereby preventing damage to provide longtime reliability.

10 Claims, 3 Drawing Sheets

OPTICAL FIBER ARRAY

This application is a C-I-P of Ser. No. 09/268,966 filed Mar. 16, 1999.

BACKGROUND OF THE INVENTION AND RELATED ART STATEMENT

The present invention relates to an optical fiber array formed by fixing optical fibers in V-shaped grooves.

In recent years, due to the increasing density of optical fibers, more and more fibers are used for planar waveguides (PLC). To avoid the increase in size of waveguide elements associated with the increasing number of fibers and to further increase the density, efforts are being made to reduce the conventional standard type waveguide pitch. To account for the increasing density of optical fibers and the decreasing waveguide pitch, efforts are also being made to reduce the inter-fiber pitch of fiber arrays connected to optical fibers.

FIG. 4 shows an example of a half-pitch fiber array formed by reducing the conventional pitch down to about half.

In FIG. 4, a covered fiber housing substrate 15 is stuck and fixed to a lower substrate 10 having V-shaped grooves, from above a step section 12 of the lower substrate 10, and covered fibers 13a and 13b arranged in two stages are inserted through a covered housing groove 17 formed in the covered fiber housing substrate 15 so that the upper and lower fibers are alternately aligned in the V-shaped grooves. Then, an upper substrate (a fiber presser substrate) 11 is installed and fixed to the lower substrate 10 from above the V-shaped grooves therein to form an optical fiber array 22.

However, in the optical fiber array of the above structure, an adhesive is used to fix non-covered optical fibers and covered optical fibers between the upper and lower substrates. A large amount of adhesive, however, is filled particularly in a portion over the step section 12 in the covered housing groove 17, so stress (distortion) caused by the hardening and contraction of the adhesive cannot be neglected.

SUMMARY OF THE INVENTION

The present invention has been achieved in view of this problem, and its object is to provide an optical fiber array that mimizes stress remaining therein after an adhesive is hardened to fix the optical fibers, thereby preventing damage to provide longtime reliability.

According to the present invention, there is provided an optical fiber array comprising an upper substrate and a lower substrate in which V-shaped grooves are formed, optical fibers being inserted and arranged in the V-shaped grooves and being solidified using an adhesive, wherein the upper substrate comprises a fiber presser substrate for pressing the optical fibers in the V-shaped grooves and a covered fiber housing substrate in which covered optical fibers are housed, the lower substrate comprising a V-shaped groove section having V-shaped grooves in which the optical fibers are aligned and arranged, a covered optical fiber support section for supporting the covered optical fibers, and a V-shaped groove step section located between the V-shaped groove section and the covered optical fiber support section, and wherein the top surface and/or sides of a non-covered optical-fiber section are open between the V-shaped groove section or the V-shaped groove step section and the coverage-removed end of the covered optical fibers.

DETAILED DESCRIPTION OF PREFERRED EMBODIMENT

Embodiments of this invention will be described below in detail with reference to the drawings. In the embodiments in FIGS. 1 to 3, the description of fibers and an adhesive is omitted to avoid complicated illustration.

Figure 1:
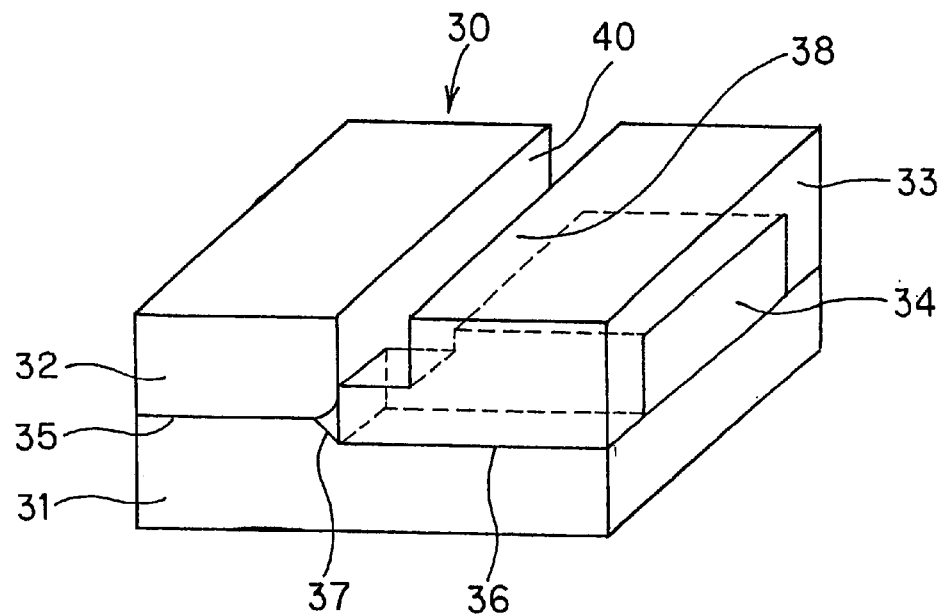
FIG. 1 is a perspective view showing an example of a standard optical fiber array having covered fibers arranged in one stage according to this invention.

FIG. 1 is a perspective view showing an example of a standard optical fiber array having one covered-fiber step provided in a lower substrate.

In FIG. 1, an optical fiber array 30 comprises a lower substrate 31 having V-shaped grooves formed in its surface, a fiber presser substrate 32 that is located above the V-shaped grooves in the lower substrate 31 to press non-covered (bare) optical fibers in the V-shaped grooves, and a covered fiber housing substrate 33 for pressing covered optical fibers. In addition, the lower substrate 31 comprises a V-shaped groove section 35 having V-shaped grooves in which optical fibers are aligned and arranged, a covered optical fiber support section 36 for supporting the covered optical fibers, and a V-shaped groove step section 37 located between the V-shaped groove section 35 and the covered optical fiber support section 36. The covered optical fibers are inserted through the covered housing groove 34 formed in the covered fiber housing substrate 33 so that the non-covered optical fibers at the tips of the fibers are aligned in the V-shaped grooves of the V-shaped groove section 35.

After the optical fibers have been inserted and located in the V-shaped grooves in this manner, an adhesive is filled in the gap between the fiber presser substrate 32 and covered fiber housing substrate 33 constituting the upper substrate, and the lower substrate 31, non-covered optical fibers, and covered optical fibers. Then, the substrates are normally irradiated with ultraviolet rays to harden the adhesive in order to complete the optical fiber array 30.

As described above, a large amount of adhesive is filled in the non-covered optical-fiber portion in the covered housing groove 34, particularly, from the V-shaped groove step section 37 to the cover-removed ends of the covered optical fibers, causing a large amount of stress (distortion) remaining after the adhesive has hardened and contracted.

In the optical fiber array 30 according to this invention, an open section 40 is formed in the top surface of the non-covered optical-fiber section of the covered fiber housing substrate 33 located between the V-shaped step section 37 and the cover-removed ends 38 of the covered optical fibers, as shown in FIG. 1.

The top surface of the non-covered optical fiber section is opened in this manner, so if the adhesive is hardened and contracted in this portion, the adhesive resin is deformed to minimize the generation of stress, thereby minimizing stress remaining the optical fiber array. As a result, losses caused by the stress of the covered fiber housing substrate and the fibers are prevented to provide an optical fiber array that has a longtime reliability.

Figure 2:
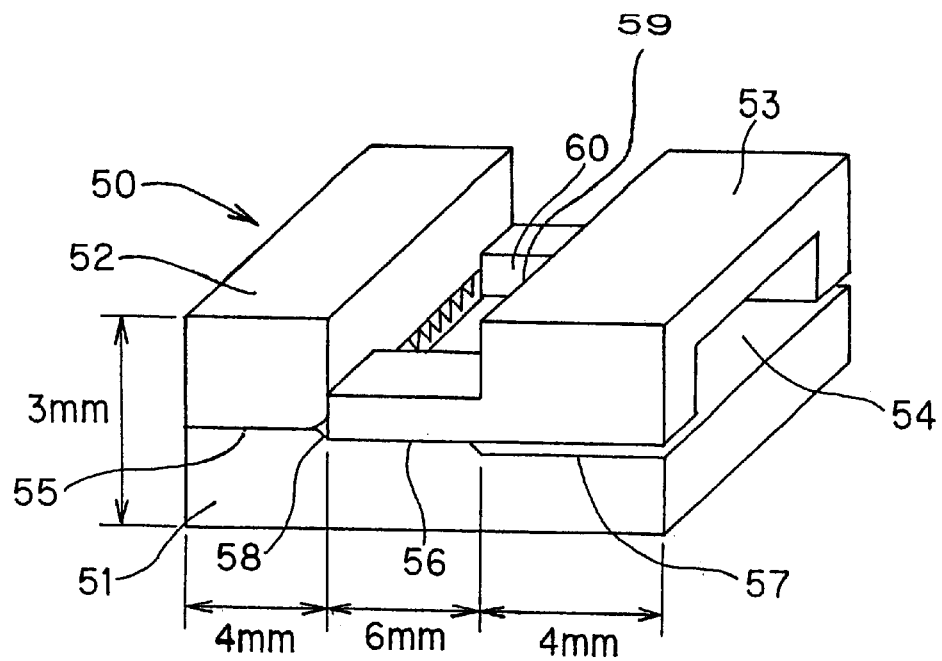
FIG. 2 is a perspective view showing an example of a half-pitch optical fiber array having covered fibers arranged in two stages according to this invention.

FIG. 2 is a perspective view showing an example of a half-pitch optical fiber array having covered-fibers arranged in two stages according to this invention.

In FIG. 2, an optical fiber array 50 comprises a lower substrate 51 having V-shaped grooves formed in its surface, a fiber presser substrate 52 located above the V-shaped grooves in the lower substrate 51 to press non-covered (bare) optical fibers in the V-shaped grooves, and a covered fiber housing substrate 53 for pressing covered optical fibers. In addition, the lower substrate 51 comprises a V-shaped groove section 55 having V-shaped grooves in which optical fibers are aligned and arranged, a first step section 56 that is a free buffer section, a covered optical fiber support section 57 for supporting the covered optical fibers, and a V-shaped groove step section 58 located between the V-shaped groove section 55 and first step section 56.

The covered optical fibers are inserted through the covered housing groove 54 formed in the covered fiber housing substrate 53 so that the non-covered optical fibers at the tips of the fibers are aligned in the V-shaped grooves of the V-shaped groove section 55. After the optical fibers have been inserted and located in the V-shaped grooves in this manner, an adhesive is filled in the gap between the fiber presser substrate 52 and covered fiber housing substrate 53 constituting the upper substrate, and the lower substrate 51, non-covered optical fibers, and covered optical fibers. Then, the substrates are normally irradiated with ultraviolet rays to harden the adhesive in order to complete the optical fiber array 50.

According to this embodiment, in the lower substrate 51, the first step section 56 acting as a free buffer section continues with the covered optical fiber supporting section 57 via a step. The first step section 56 has no V-shaped grooves to eliminate the needs for positional restraints for aligning and arranging the fibers, so a taper can be obtained despite the presence of the pitch error of the covered optical fibers (tape fibers) to avoid problems such as the breakage of optical fibers.

Specifically, the length of the first step section 56 is preferably 5 mm or more because the bend radius of the fiber resulting from the covered optical fibers each of thickness 0.3 mm arranged in two stages is 200 mm or more, so that losses can be avoided to provide reliability. According to the embodiment in FIG. 2, the length of the first step section 56 was 6 mm. Although the width of the first step section 56 depends on the number fibers, a 24-half-pitch fiber array of width 7 mm was produced.

In the optical fiber array 50 according to this embodiment, an open section 60 was opened in the top surface of the non-covered optical fiber section of the covered fiber housing section 53 between a V-shaped step section 58 and the cover removed ends 59 of the covered optical fibers.

The top surface of the non-covered optical fiber section are opened in this manner like this, so despite the hardening and contraction of the adhesive, stress escapes from the open section 60 to minimize remaining stress to avoid losses, thereby providing an optical fiber array that has a longtime reliability.

Incidentally, in this embodiment, the substrate having V-shaped grooves is provided with a two-step difference in level, which is formed by three surfaces of the V-shaped groove section 55, the first step section 56, and the covered optical fiber support section 57.

When the substrate having V-shaped grooves has two surfaces (a one-step difference) of the V-shaped groove section 55 and the covered optical fiber support section 57, a free buffer section is arranged in the covered optical fiber support section 57. In other words, the covered optical fiber support section 57 supports the covered optical fibers in the rear part, and the non-covered (bare) optical fibers float in the front part of the covered optical fiber support section 57. In this case, an adhesive is filled in the gap between the covered optical fiber support section 57 and the lowest portion of the bare optical fibers, thereby stress due to shrinkage by hardening and thermal fluctuation is applied to the fibers, which may cause increase in loss, etc. Further, since it is difficult to position the covered optical fibers precisely in the longitudinal direction, the free buffer section may have variance in length, which makes control of a bending radius of the fibers difficult.

To avoid these problems, a volume of the adhesive to be filled in the gap between the covered optical fiber support section 57 and the lowest portion of the bare optical fibers is reduced by shortening the distance between the covered optical fiber support section 57 and the lowest portion of the bare optical fibers by providing the substrate having V-shaped grooves with a two-step difference in level in which the first step section 56 is a free buffer section. Further, the covered optical fibers are accurately positioned in the longitudinal direction by utilizing a portion having a difference in level which is formed by the first step section 56 and the covered optical fiber support section 57 for a positioning surface of the covered optical fibers, thereby a bending radius of the fibers can be accurately controlled.

Figure 3:
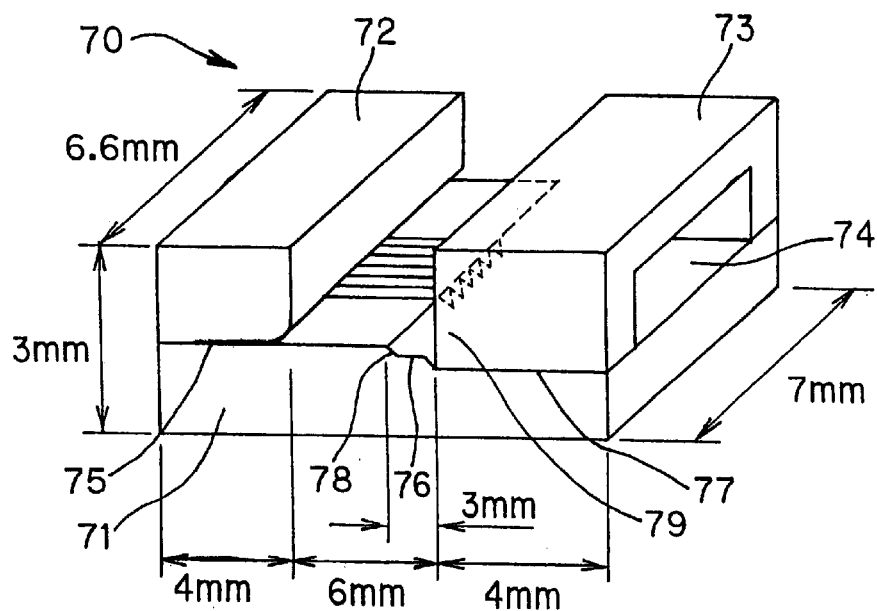
FIG. 3 is a perspective view showing another example of a half-pitch optical fiber array having covered fibers arranged in two stages according to this invention.
Figure 4:
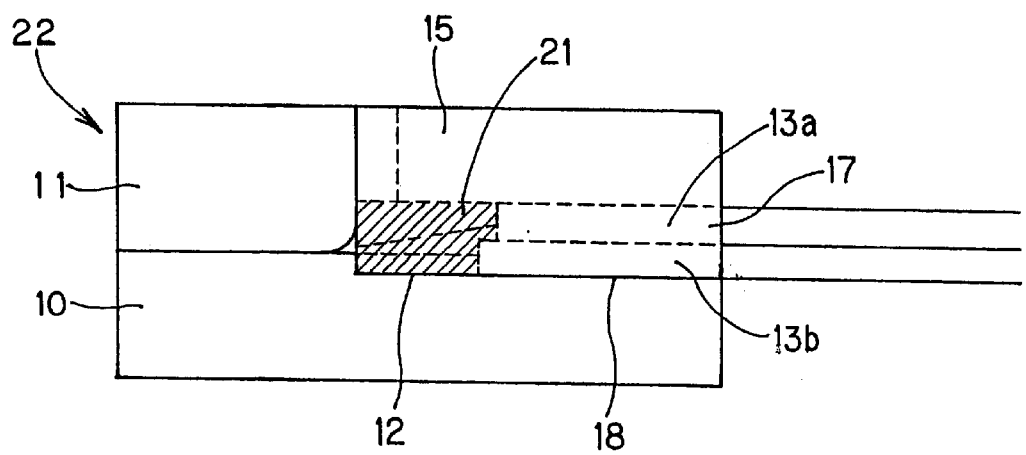
FIG. 4 is a front view showing an example of a conventional half-pitch fiber array.

FIG. 3 is a perspective view showing another example of a half-pitch optical fiber array having covered-fibers arranged in two stages according to this invention.

In FIG. 3, an optical fiber array 70 comprises a lower substrate 71 having V-shaped grooves formed in its surface, a fiber presser substrate 72 located above the V-shaped grooves in the lower substrate 71 to press non-covered (bare) optical fibers in the V-shaped grooves, and a covered fiber housing substrate 73 for pressing covered optical fibers, similarly as in FIG. 2. In addition, the lower substrate 71 comprises a V-shaped groove section 75 having V-shaped grooves in which optical fibers are aligned and arranged, a first step section 76 that is a free buffer section, a covered optical fiber support section 77 for supporting the covered optical fibers, and a V-shaped groove step section 78 located between the V-shaped groove section 75 and the first step section 76.

And the covered optical fibers are inserted through the covered housing groove 74 formed in the covered fiber housing substrate 73 so that the non-covered optical fibers at the tips of the fibers are aligned in the V-shaped grooves, and an adhesive is filled in the gap between the fiber presser substrate 72 and covered fiber housing substrate 73, and the lower substrate 71, non-covered optical fibers, and covered optical fibers. Then, the substrates are normally irradiated with ultraviolet rays to harden the adhesive in order to complete the optical fiber array 70.

In the embodiment in FIG. 2, the side end of the fiber presser substrate 52 that is the upper substrate contacts the V-shaped groove step section 58. This configuration is advantageous for alignment in assembling the fiber presser substrate 52. The upper substrate, however, has a relatively complicated shape to increase processing costs, and if constant processing quality is not maintained and particularly if the substrate is formed of glass, processing defects may occur to degrade quality. In addition, to prevent stress caused by the adhesive present in the gap between the covered fiber housing substrate 53 and the second step section 57 from acting on the covered fiber housing section 53 to degrade the longtime reliability and the reliability for harsh environments such as a temperature of −40° C., for example, the adhesive used for this portion must have a low Young's modulus.

Then, in the optical fiber array 70 according to the embodiment of FIG. 3, the fiber presser substrate 72 was configured to press the non-covered (bear) optical fibers in part of the V-shaped groove section 75 of the lower substrate 71 instead of the entire V-shaped groove section 75 and the covered fiber housing substrate 73 was configured to cover only the top of the covered optical fiber support section 77 of the lower substrate 71 for supporting the covered optical fibers, as shown in FIG. 3.

Accordingly, the top surface and sides of the non-covered optical fiber section between part of the V-shaped groove section 75 and the cover removed ends 79 of the covered optical fibers are opened. This portion serves to reduce the bending of the fibers caused by the arrangement of the covered optical fibers in two stages, and the length of this portion was 6 mm according to the embodiment in FIG. 3.

In addition, the first step section 76 according to this embodiment acts as a taper reduction section until the lower ones of the covered optical fibers arranged in two stages are mounted in the V-shaped grooves. In this case, the taper is a bend caused by the alignment error of the covered optical fibers and in case of standard covered optical fibers (ribbon fibers), corresponds to an offset of 0.1 mm (in an 8-fiber ribbon design in which the distance between the first and eighth fibers is 1.75 mm, the offset is 1.85 mm). To obtain a fiber bend radius of 20 mm or more to improve the reliability, the length must be 2 mm or more. Thus, it was 3 mm according to this invention.

Since a portion over part of the V-shaped groove section 75 and a portion over the first step section 76 are opened in this manner, the top surface and sides of the non-covered optical fiber section located between these portions are opened. Consequently, despite the hardening and contraction of the adhesive, the stress escapes from the open portion to minimize the remaining stress, as described above.

In addition, since the structure of the covered fiber housing structure is simplified as compared with the structure in FIG. 2, the optical fiber array 70 shown in FIG. 3 can be processed easily and implemented industrially effectively. Besides, in contrast to the embodiment shown in FIG. 2, there is almost no gap between the covered fiber housing substrate 73 and the second step portion (covered optical fiber support section) 77, thereby almost completely preventing the stress of the covered fiber housing substrate 73 caused by the adhesive.

Furthermore, an optical fiber array of an entirely open structure that does not have any covered fiber housing substrate is conventionally well known, but in this case, the application of bending (particularly, in the thickness direction) stress to the covered optical fibers causes the optical fibers to peel off at the adhesion section. As a result, the stress concentrates in the portion of the bare fibers that is pressed by the fiber presser substrate 72, possibly causing a broken fiber that is a critical defect. In addition, since the adhesive is entirely exposed to the exterior, this array is likely to degrade due to an external environment (in particular, humidity or temperature). On the contrary, in the optical fiber array in FIG. 3, the covered fiber housing substrate 73 can hold the covered optical fibers, so the peel-off caused by the bending stress can be prevented to provide a longtime reliability.

Also, in this embodiment, the substrate having V-shaped grooves was formed so as to have a two-step difference for the same purpose as the embodiment in FIG. 2.

Figure 5:
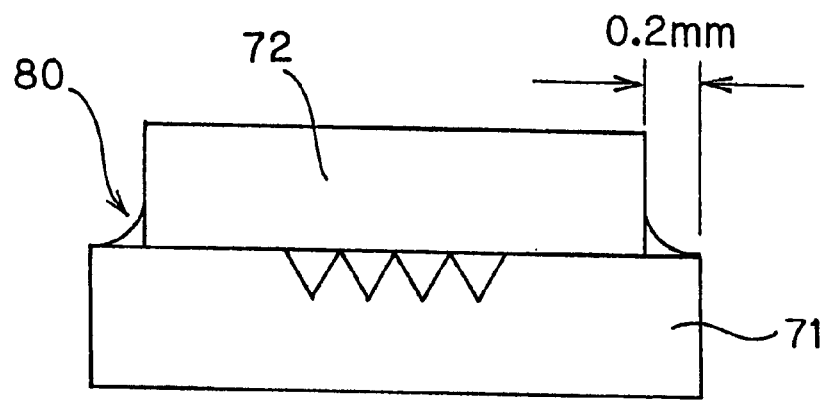
FIG. 5 is an explanatory drawing showing an embodiment in which a fiber presser substrate has a reduced width.
Figure 6:
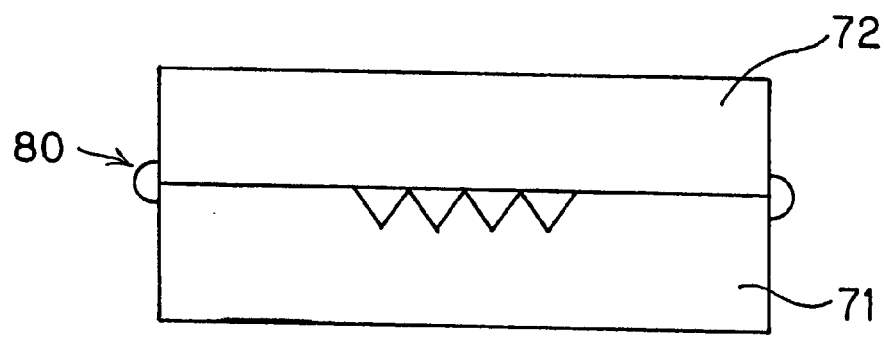
FIG. 6 is an explanatory drawing showing an embodiment in which the fiber presser substrate and a lower substrate have the same width.

The embodiment shown in FIG. 3 does not have a guide function used in assembling the fiber presser substrate as in the embodiment in FIG. 2, but by forming the fiber presser substrate 72 so as to be smaller in the widthwise direction, as shown in FIG. 5, assembly can be achieved easily. Thus, this configuration is more preferable. That is, the fiber presser substrate 72 can be easily prevented from being protruded from the lower substrate 71 despite a lateral or rotational shift.

In addition, in the state of FIG. 5, the meniscus shape of the adhesive 80 approaches its ideal shape and the adhesive strength and reliability are improved, as compared with the case of the adhesive 80 in which the fiber presser substrate 72 and the lower substrate 71 have almost the same width.

Furthermore, depending on the used shape, the protruding adhesive may be a hindrance and must thus be removed. In this case, an extra removal operation is added and may cause defects, thereby degrading quality. However, by reducing the width of the fiber presser substrate 72, the shape of the adhesive 80 is formed as shown in FIG. 5 so that the protrusion can be prevented.

The width of the fiber presser substrate 72 may be set so as to be smaller than that of the lower substrate 71 by about 0.1 mm on the respective sides. In the embodiment in FIG. 5, the width of the lower substrate 71 is 7 mm, and the width of the fiber presser substrate 72 is shorter than that of the lower substrate 71 by 0.2 mm on the respective sides, that is, 6.6 mm.

As regards this, by reducing the width of the fiber housing substrate, the lateral alignment becomes easier and the adhesive strength increases.

Furthermore, for the conventional optical fiber array, the provision of a resin hole has been proposed as in Japanese Patent Publication No. 6-109952. If, however, the array is formed of glass, a defect may occur in the resin hole during processing to degrade the quality.

On the contrary, this invention opens the top of the free buffer section instead of the conventional resin hole to provide the same effects as in the resin hole while preventing the quality from being degraded during processing.

This invention is applicable not only to the half-pitch fiber array in FIGS. 2–3 but also to the fiber array of a standard 250-μm pitch (one-stage ribbon fiber) in FIG. 1. In the latter case, the length of the free buffer section is preferably 2 mm or more.

The upper and lower substrates in which the optical fiber array according to this invention is formed are composed of a material through which light is transmitted, for example, glass material or plastic material.

As described above, this invention can provide an optical fiber array that minimizes the stress remaining in the array after the hardening of the adhesive to prevent losses in order to provide a longtime reliability.

What is claimed is:

1. An optical fiber array comprising:
    a lower substrate having a first end and a second end opposed thereto along a first longitudinal direction, sides extending from said first end to said second end, and upper and lower surfaces, said lower substrate including a groove section arranged in said upper surface proximate said second end, a support section arranged in said upper surface proximate said first end, and a groove step section arranged in said upper surface between said groove section and said support section;

an upper fiber presser substrate opposed to said groove section; and an upper fiber housing substrate opposed to said support section, said upper fiber housing substrate including a top surface and side surfaces arranged substantially parallel to the sides of said lower substrate, wherein at least a portion of at least one of said side surfaces of said upper fiber housing substrate is open and spaced, along said first longitudinal direction, away from said upper fiber presser substrate.

2. The optical fiber array of claim 1, wherein the entirety of said at least one of said side surfaces of said upper fiber housing substrate is open and spaced, along said first longitudinal direction, away from said upper fiber presser substrate.

3. The optical fiber array of claim 1, wherein at least a portion of both of said side surfaces of said upper fiber housing substrate is open and spaced, along said first longitudinal direction, away from said upper fiber presser substrate.

4. The optical fiber array of claim 1, wherein the entirety of both of said side surfaces of said upper fiber housing substrate is open and spaced, along said first longitudinal direction, away from said upper fiber presser substrate.

5. The optical fiber array according to claim 1, wherein the spacing between said at least a portion of at least one of said side surfaces of said upper fiber housing substrate and said upper fiber presser substrate is sufficient to allow the optical fibers to have a bend radius of 20 mm or more.

6. The optical fiber array according to claim 1, wherein the top surface of said upper fiber housing substrate is open and spaced, along said first longitudinal direction, away from said upper fiber presser substrate.

7. The optical fiber array according to claim 1, further comprising a second step section arranged in said upper surface between said groove step section and said support section.

8. The optical fiber array according to claim 7, wherein said upper fiber housing substrate is mounted on said second step section.

9. The optical fiber array according to claim 1, wherein the length and width of said upper fiber presser substrate are smaller than the length and width of said groove section of said lower substrate.

10. The optical fiber array according to claim 1, wherein the width of said upper fiber housing substrate is smaller than the width of said support section of said lower substrate.

* * * * *